Figure 1:
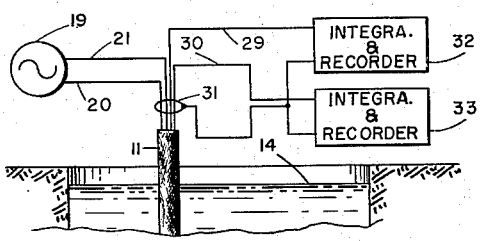
Figure 1:
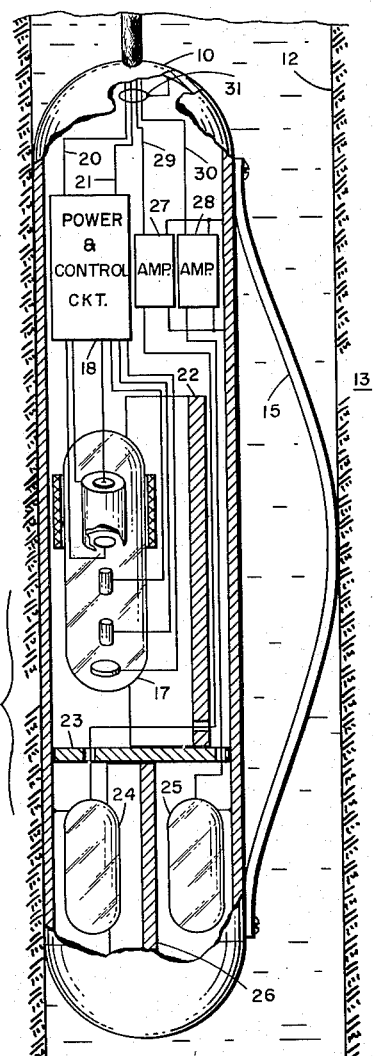

Aug. 15, 1961  C. GOODMAN ET AL  2,996,618
WELL LOGGING METHODS AND APPARATUS
Filed July 13, 1954  2 Sheets-Sheet 1

INVENTOR.
CLARK GOODMAN
JOHN T. DEWAN
BY Robert Hockfield
THEIR ATTORNEY

Aug. 15, 1961 — C. GOODMAN ET AL — 2,996,618
WELL LOGGING METHODS AND APPARATUS
Filed July 13, 1954 — 2 Sheets-Sheet 2

*INVENTOR.*
CLARK GOODMAN
JOHN T. DEWAN
BY
Robert Hockfield
THEIR ATTORNEY

United States Patent Office 2,996,618
Patented Aug. 15, 1961

2,996,618
WELL LOGGING METHODS AND APPARATUS
Clark Goodman, Boston, Mass., and John T. Dewan, Houston, Tex., assignors, by mesne assignments, to Schlumberger Well Surveying Corporation, Houston, Tex., a corporation of Texas
Filed July 13, 1954, Ser. No. 443,074
16 Claims. (Cl. 250—83.3)

This invention relates to well logging methods and apparatus and, more particularly, pertains to new and improved methods and apparatus for deriving a log of a nuclear phenomenon induced in earth formations under bombardment by neutrons.

In general, conventional radioactivity logging apparatus provides rather limited information concerning earth formations traversed by a well or borehole. Specifically, the derived neutron log usually denotes hydrogen content and no useful information is obtained regarding other elements, the presence or absence of which might be indicative of important lithological characteristics of the earth formations.

It is, therefore, an object of the present invention to provide new and improved methods and apparatus for well logging which afford more information concerning earth formations than heretofore possible.

Another object of the present invention is to provide new and improved methods and apparatus for well logging wherein the concentration of various elements in subsurface formations may be evaluated by means of the selective induction of a nuclear phenomenon.

In accordance with the method of the present invention, earth formations traversed by a borehole are irradiated by neutrons of one or more selected energy levels and a resulting nuclear phenomenon having a selected characteristic is detected. Indications are obtained of the detected phenomenon as a function of depth in the borehole thereby to derive a log of the earth formations.

According to another aspect of the present invention, apparatus is provided for irradiating earth formations with one or more selected energy levels. To this end, a high-energy source of monoenergetic neutrons is supported for movement through a borehole while being maintained adjacent a sidewall zone of the borehole. A first detector, supported adjacent this sidewall zone of the borehole, is adapted to respond to a nuclear phenomenon resulting from bombardment of the earth formations by high energy neutrons. High-energy neutrons which travel away from the sidewall zone are moderated or slowed by the drilling fluid present in the borehole or by a suitable moderator element and thus formations are irradiated with neutrons at another, or lower, energy level. A second detector is provided for detecting a nuclear phenomenon resulting from irradiation of the formations by neutrons of the latter energy level.

The novel features of the present invention are set forth with particularity in the appended claims. The present invention, both as to its organization and manner of operation, together with further objects and advantages thereof, may best be understood by reference to the following description taken in connection with the accompanying drawings in which:

FIG. 1 is a schematic diagram of well logging apparatus, shown in longitudinal cross section, embodying the present invention; and FIGS. 2, 3, 4, 5, 6 and 7 are schematic representations of various modifications which may be made to the apparatus illustrated in FIG. 1.

The invention may be better understood by first considering the following discussion relative to the physical phenomena involved. This discussion is presented solely to enable an understanding of the invention and is not intended as a rigorous and complete theoretical analysis. Thus, it is not to be construed in any way as limiting the scope of the invention.

Radioactivity may be induced in elements by neutrons of widely different energies. For convenience in classifying these energies, it is customary to speak of thermal neutrons for those whose energies lie between approximately 0.01 and 1 electron volt, while epithermal neutrons are those whose energies lie between approximately 1 electron volt and 1 million electron volts (mev.). Fast neutrons are those whose energies lie between approximately 1 and 14 mev. and very fast neutrons are those whose energies lie in excess of 14 mev.

It is also customary to identify the type of reaction which results in the induced radioactivity by the following notation: $A(x,y)B$ where $A$ is an initial element bombarded by waves or particles $x$, and $B$ is a resultant element, $y$ being resultant waves or particles. For example, $(n,\gamma)$ indicates that a neutron has been absorbed by an element forming an isotope of the same element with a mass 1 unit greater, a gamma ray being emitted during the process. These so-called capture gamma rays are the ones which are ordinarily observed in conventional $(n,\gamma)$ logging. In addition, gamma radiation may also be emitted in the decay of a radioactive element formed as a result of neutron capture.

An important feature of an $(n,\gamma)$ reaction is that it is always exoergic, i.e. it has a positive Q. Hence, $(n,\gamma)$ reactions may occur with neutrons of all energies including thermal neutrons. In fact, it may be generally stated that $(n,\gamma)$ reactions occur more readily with thermal neutrons than with higher energy neutrons. As will be more apparent from the discussion to follow, this is an important factor in the selective type of neutron activation to be described in connection with the present invention.

Another type of neutron reaction is the neutron, proton $(n,p)$ reaction which occurs in some light elements with thermal neutrons, but in general fast, or very fast, neutrons are required to produce the reaction. An $(n,p)$ reaction leads to an element next lower in atomic number to that of the element bombarded. However, an element of the same atomic weight, usually referred to as an isobar, is formed.

A third type of reaction is the neutron, alpha $(n,\alpha)$ reaction which also occurs with thermal neutrons in a few light elements, but in general requires fast, or very fast, neutrons. This reaction produces an element which is two lower in atomic number and three lower in atomic weight than the element or isotope bombarded.

A fourth type of reaction is the neutron, 2 neutron $(n,2n)$ reaction which is always endoergic, i.e. it has a negative Q and hence fast, or very fast, neutrons are required in order to produce the reaction.

A fifth type of reaction is the inelastic scattering of neutrons characterized by the symbol $(n,n')$. This reaction is always endoergic, $n'$ meaning that the neutron comes out with less energy than with which it went in. In order to have inelastic scattering of neutrons, the neutrons must have an energy greater than the first excited state of the element bombarded. For light elements (with the exception of fluorine) this requires fast neutrons, while for heavier elements it may require fast neutrons, but in general requires only neutrons of epithermal energy. In general, inelastic scattering of fast neutrons leads to prompt gamma radiation. In a few elements this gamma radiation is emitted over a measurable period of time, in which case it is called isomeric radioactivity.

A sixth type of reaction is designated $(n,f)$ in which a neutron, thermal, epithermal, fast or very fast in energy is absorbed and results in fission of the element bombarded. Fission fragments formed are generally radioactive and hence can be used to identify the presence of fissionable elements in earth formations.

The probability that a particular reaction will occur, of course, depends upon the elements and particles involved. This characteristic of the reaction usually is referred to as the cross section, being an indication of whether the resulting nuclear phenomenon is prolific and hence readily detectable, or is improbable and hence not readily detectable.

Broadly speaking, the cross section for exoergic neutron reactions decreases with increasing energy. In the epithermal region, there are many resonances or marked peaks in the cross section.

The endoergic nuclear reactions increase with energy above a threshold value. The rise is more gradual for reactions resulting in charged particles, than for reactions in which neutrons are re-emitted.

Both exoergic and endoergic neutron reactions may result in radioactive materials which are of sufficiently short half-life and which emit sufficiently energetic radiations to be detected by moving suitable apparatus through a borehole. Thus, it is apparent that if only low energy neutrons are allowed to reach the formations, primarily exoergic reactions take place. On the other hand, if fast neutrons, such as may be produced in a generator in which a tritium target is bombarded by deuterium ions, are employed to irradiate the formations, endoergic neutron reactions may occur provided, however, the neutron energy exceeds the threshold required.

In addition, some activation of exoergic reactions will occur for two reasons. In the first place, the cross section, though small, is appreciable in the high energy region. Secondly, and more important, epithermal or thermal neutrons result from the slowing down of fast neutrons in the borehole or in the formations. As will be described hereinafter, the formations may be irradiated with both low and high energy neutrons simultaneously by apparatus constructed according to the present invention so that induced activities may be selectively detected in such a way that the specific effects of individual elements of interest may be distinguished, thereby to provide more information concerning the earth formations than heretofore obtainable.

Referring now to FIG. 1 of the drawings, well logging apparatus constructed in accordance with the present invention is shown to comprise a housing 10 supported by a cable 11 within a borehole 12 traversing earth formations 13. The borehole 12 may be filled with a drilling fluid 14, such as a water base mud, and may be cased, or uncased as shown. Cable 11 is employed, together with a winch (not shown) at the surface of the earth to lower and raise housing 10 in borehole 12 in a customary manner.

Housing 10 is maintained in engagement with a portion of the sidewall of borehole 12 by a bowed spring 15. If desired, means (not shown) may be provided for retracting spring 15 toward housing 10 to facilitate the lowering of the housing prior to its being raised for a logging run.

Supported within housing 10 in the vicinity of a sidewall zone 16 of the borehole engaged by the housing is a source of high energy neutrons such as a neutron generator 17. The neutron generator 17 may be of the type disclosed in the copending application of J. T. Dewan, filed April 9, 1952, bearing the Serial No. 281,378 and assigned to the same assignee as the present invention. A power and control circuit unit 18 is connected to generator 17 and, in turn, is energized from a power source 19 at the surface of the earth via insulated conductors 20 and 21 of cable 11. Of course, other types of neutron generators suitable for borehole use may be employed, such as the one disclosed in the copending application of Clark Goodman, filed March 11, 1952, bearing the Serial No. 275,932 and assigned to the same assignee as the present invention.

As stated in the Dewan application, generator 17 produces neutrons at an energy level of 14 mev. and some of these neutrons irradiate the earth formations via the sidewall zone 16 of the borehole 12. Neutrons travelling in other directions may encounter a semi-cylindrical moderator 22 which encompasses generator 17, in part, and is supported on the side thereof opposite the zone 16. Moderator 22, for example, may be comprised of paraffin, or preferably is constructed of tungsten sheets interlayered with paraffin to achieve maximum slowing down of neutrons in as thin a layer as possible. Neutrons thus moderated may be further moderated by drilling fluid 11, and the earth formations 13 are thereby irradiated with neutrons of another energy level, such as thermal energy.

The portion of housing 10 below generator 17 is closed by a neutron shield 23 which may be comprised of a paraffin moderator and a cadmium absorber of sufficient thickness to prevent resulting gamma radiation from reaching detectors 24 and 25 which are supported below shield 23. The detectors 24 and 25 may be conventional Geiger tubes and a suitable semi-cylindrical shield 26 is provided which faces detector 24 and zone 16 of the borehole 12 so that detectors 24 and 25 respond primarily to nuclear phenomena resulting from irradiation of formations 13 by high energy and low energy neutrons, respectively. For example, shield 26 may be composed of lead in applications wherein detectors 24 and 25 respond to gamma radiations.

The detectors 24 and 25 are suitably energized and are coupled to individual amplifiers 27 and 28 whose output signals are derived at the surface of the earth via cable conductors 29 and 30 and cable shield 31. Connections from conductors 29 and 30 and shield 31 extend to individual integrator and recorder units 32 and 33. Each of units 32 and 33 may comprise a suitable integrator, such as a capacitor, coupled to a recording voltmeter wherein the recording medium is displaced in proportion to movement of housing 10 through borehole 12. Preferably, a single recording medium is employed for both units 32 and 33 so that a pair of records or logs may be derived simultaneously.

In operation, as housing 10 is passed through borehole 12, neutrons having an energy of 14 mev. are derived by generator 17 and enter formations 13 via sidewall zone 16 of the borehole. The formations thus are irradiated with high energy neutrons. At the same time some of the neutrons from generator 17 directed away from zone 16 are slowed to a thermal energy level by moderator 22. Hence, the formations at the same depth but opposite zone 16 are irradiated by low energy neutrons.

High and low energy neutrons react with one or more of the elements constituting the earth formations and through processes outlined hereinbefore one of the resulting nuclear phenomena may be the emission of gamma radiation. For example, some of the gamma radiation due to inelastic scattering of high energy neutrons is intercepted by detector 24 and some of the gamma radiation resulting from capture of slow neutrons is intercepted by detector 25. The pulse rate of the output signal of each of these detectors is a measure of the intensity of the respective gamma radiation incident thereon. These pulse signals are amplified in amplifiers 27 and 28 and supplied to the integrator-recorder units 32 and 33, respectively.

In each of units 32 and 33 a voltage is developed representing the intensity of corresponding gamma radiation, and the resulting pair of records is indicative of gamma radiation due to inelastic scattering of neutrons and of gamma radiation resulting from neutron capture, respectively, versus depth. These records may be employed to determine important characteristics concerning earth formations 13 as may be more apparent from a discussion to be presented hereinafter.

If desired, a single recorder may be employed and supplied with a voltage representing a combination of the output signals of the detectors 24 and 25. In this way, for example, the ratio of these signals may be indicated.

The longitudinal spacings between the target portion of neutron generator 17 and detectors 24 and 25 may be arranged in any desired manner. These spacings may be the same or may be different to suit the particular needs of the nuclear phenomenon being observed.

Figure 2:
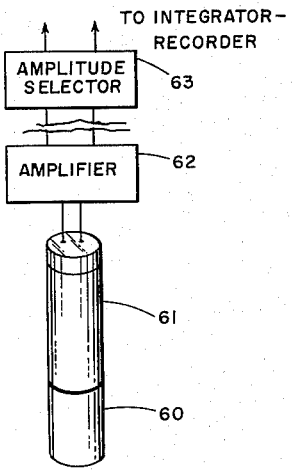

While Geiger type detectors have been described, obviously other forms may be employed, such as proportional counters, ionization chambers, or scintillation detectors. Thus, each of the detectors may be of the scintillation type which, as shown schematically in FIG. 2, is comprised of a scintillation element 60 wherein incident gamma radiation is converted to light energy optically coupled to a photomultiplier 61 for converting the light energy into electrical impulses in a known manner. Such a scintillation detector provides output pulses having an amplitude dependent upon the energy of incident radiation and the photomultiplier is coupled to an amplifier 62, in turn, coupled to an amplitude selector 63 provided at the earth's surface. The amplitude selector may be coupled to a corresponding one of the integrator-recorder units 32, 33. Thus, a desired portion of the radiant energy, or gamma ray, spectrum incident on one of the detectors may be selectively logged in a known manner. Of course, a light-reflecting layer may be provided for scintillation element 60, except for the portion thereof that is optically coupled to photomultiplier 61.

Beta rays may be detected by providing a thin shell for such scintillation detectors arranged so that high energy beta radiation may enter the shell and activate the scintillation element as described in the copending application of Clark Goodman, filed September 24, 1951, bearing the Serial No. 247,978 and assigned to the same assignee as the present invention. As there stated, the scintillation element may be exposed to the full hydrostatic head of drilling fluid 11 and light energy from the scintillation element is transmitted to the photomultiplier which is supported within the housing via a suitable transparent window, for example, made of quartz.

Figure 3:
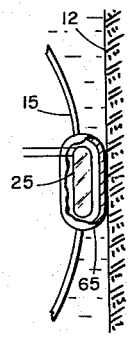

Detector 25 of FIG. 1 may be supported within a pad-like housing 65 as shown in FIG. 3. Housing 65 is supported centrally on bowed spring 15 so that it is pressed against the portion of the sidewall of borehole 12 essentially opposite sidewall zone 16 (FIG. 1).

Of course, each of the detectors 24 and 25 of FIG. 1 may be in the form of two or more suitably shielded counters supported in side-by-side relation.

If desired, one of the detectors 24 and 25 may be arranged to respond to high energy beta rays while the other is responsive to a selected gamma ray energy level.

Alternatively one or both of the detectors may be responsive to neutrons of a selected energy. For example, detector 24 may be arranged to respond only to slow neutrons while detector 25 responds to gamma radiation.

As explained earlier, neutron generator 17 of FIG. 1 may produce neutrons at an energy of 14 m.e.v. by reactions between accelerated deuterium ions and tritium. If desired, instead of tritium, deuterium may be employed in the target of the generator so that neutrons having an energy in the range from 2.5 to 3.0 mev. are derived.

Figure 4:
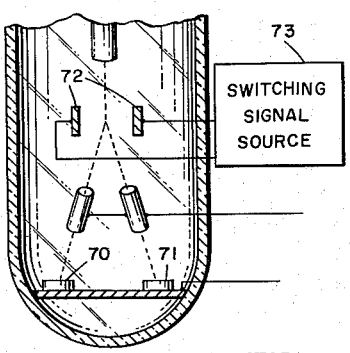

Alternatively, the neutron generator may be modified in the manner shown in FIG. 4 to include a deuterium target 70, a tritium target 71 and deflection plates 72. This type of arrangement is disclosed in the copending application of H. B. Frey, filed April 9, 1952, bearing the Serial No. 281,326 and assigned to the same assignee as the present invention. A switching signal source 73 is coupled to deflection plates 72 so that the accelerated ion beam may impinge on a selected one of the targets 70 and 71, or may be automatically controlled to alternate between the targets.

This may also be accomplished by using a rotating target on the face of which is deposited a semi-circular section of tritium and a complementary semi-circular section of deuterium.

In either case, neutrons at an energy of 14 mev. and in the energy range 2.5–3.0 mev. may be alternately derived, for example, at a rate of one cycle each two seconds using a logging speed of one foot per second. By proper phasing of the detection equipment with such alternate irradiation of the earth formations, the formations activated by neutrons at each energy may be separated.

If desired, the modified neutron generator of FIG. 4 may be utilized in the arrangement of FIG. 1 and the targets suitably spaced so that one is closer to the sidewall of the borehole than the other. Thus, the tritium target may be adjacent the sidewall, and the deuterium target more remotely positioned and surrounded by a moderator.

The neutron generator 17 of FIG. 1 may be pulsed so that neutrons are generated in "bursts" as described in the aforementioned Goodman application Serial No. 275,932. The timing of the detectors may be arranged as there stated or in accordance with the teachings of the copending application of Clark Goodman entitled, "Well Logging," filed July 8, 1954, bearing the Serial No. 414,976, now Patent No. 2,827,946, and assigned to the same assignee as the present invention. For example, detectors 24 and 25 may be normally disabled, and detector 24 operatively conditioned during the relatively short interval of the neutron "burst" while detector 25 is operatively conditioned at a later time, following an interval of neutron slowing down and diffusion. Thus, detector 24 responds to gamma radiation due to inelastic neutron collisions and detector 25 responds to gamma radiation resulting from neutron capture, to the exclusion of other nuclear phenomena.

Figure 5:
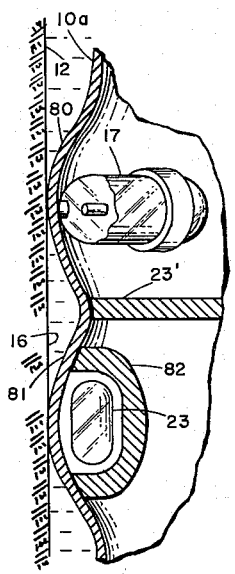

To bring the neutron generator and one of the detectors in closer association with sidewall zone 16 of the borehole 12, the arrangement of FIG. 5 may be employed. A modified housing 10a is provided with lateral protrusions 80 and 81 which engage the sidewall. Neutron generator 17 is supported laterally, instead of longitudinally, in housing 10a with its target portion within protrusion 80. Detector 23 is disposed within protrusion 81 and is enclosed by a suitable shield 82. As in the arrangement of FIG. 1, a lateral shield 23' closes the housing 10a below the neutron generator.

With the modified arrangement of FIG. 5, the effects of irradiation of the drilling fluid may be minimized while at the same time the close association of the detector with zone 16 affords a better opportunity for the interception of the nuclear phenomenon under observation.

Where mechanical penetration of the mud cake that usually forms on the sidewall of borehole 12 is not required, protrusions 80 and 81 may be constructed of rubber. However, if penetration is desired, the protrusions may be fabricated of hard metal and one or both suitably beveled to form a knife-like surface for cutting through the mud cake. Thus, the neutron generator may be brought in nearly direct contact with formations behind the mud cake.

Figure 6:
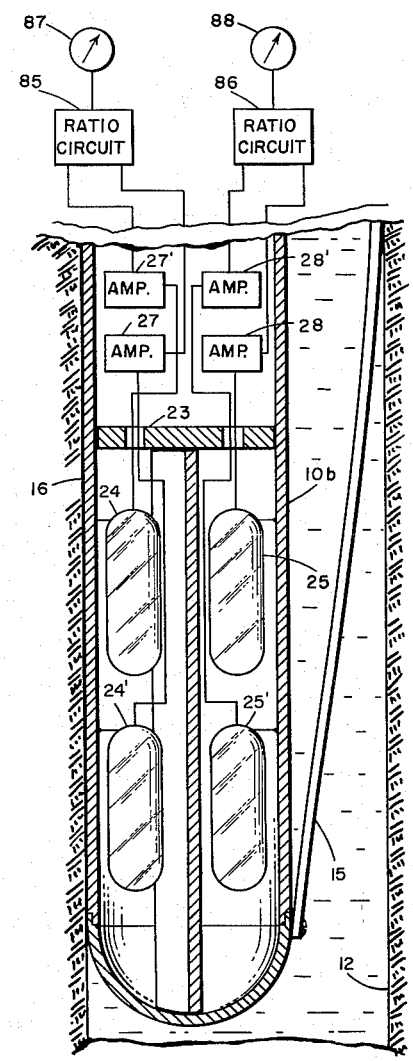

Housing 10 may be modified, or increased in length as represented by housing 10b of FIG. 6, so as to enclose additional detectors 24' and 25'. The additional detectors are longitudinally spaced from detectors 24 and 25, respectively, and are electrically coupled to amplifiers 27', 28', similar to amplifiers 27 and 28. Each pair of amplifiers, for a pair of detectors 24, 24' and 25, 25' is coupled to one of a pair of conventional ratio circuits 85, 86, in turn, coupled to indicators 87, 88. With such a modified arrangement, for a given longitudinal spacing between each pair of detectors 24, 24' and 25, 25' and a known speed of movement of housing 10b through borehole 12, two activation logs may be obtained. That is, each ratio circuit derives a voltage representing the ratio of activities intercepted in successive detectors. Thus, the half-life, or the rate of decay, of a radioactive element formed by irradiation of the earth formations is indicated on each of indicators 87 and 88.

Figure 7:
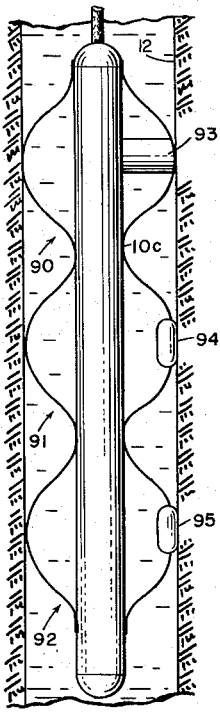

In the construction shown in FIG. 7, a housing 10c encloses various electronic circuits and supports three-bowed-spring cage assemblies 90, 91 and 92 in longitudinally spaced relation. An auxiliary pad-like housing 93 is mounted to the upper cage assembly 90 and encloses a neutron generator (not shown) whereas pads 94 and 95, each of which is similar to pad 65 of FIG. 3, enclose respective detectors (not shown). The several pads 93, 94 and 95 thus are maintained in engagement with the sidewall of the borehole 12 and may be employed to measure induced gamma radiation in the manner described in connection with the embodiment of FIG. 6.

The spring cage assemblies 90, 91 and 92 track the borehole instrument in the mud cake so that the detector pads 94 and 95 follow in the groove made by the neutron-generator-containing pad 93. In this way, the portions of the formations containing a maximal induced activity from fast neutrons are brought into direct proximity to the detectors. Thus, for a given logging speed, the ratio of the counting rates is proportional to the half-life of activated elements.

Although sidewall type apparatus has been used to illustrate the present invention, if desired, shield 26 of FIG. 1 may be arranged to provide a suitable directional characteristic in the response of detector 24 so that spring 15 may be omitted and housing 10 may traverse borehole 12 without being pressed against the sidewall.

The apparatus described hereinbefore may be employed in a variety of ways to obtain desired information concerning the earth formations under investigation. However, in order to provide a clearer understanding of the manner in which to utilize the present invention for logging earth formations, certain examples are discussed hereinafter. These, of course, are not to be construed as limiting the scope of the invention.

I. CLAY

To determine clay content, activity may be induced in any of its constituent elements, namely, aluminum, oxygen and silicon.

A. Aluminum

Aluminum is mono-isotopic, being composed 100% of the isotope of atomic weight 27. It can be activated with low-energy neutrons through the $(n,\gamma)$ reaction, leading to the isotope of atomic weight 28 having a half-life of 2.3 minutes. This radioactive isotope emits beta $(\beta^-)$ radiation at an energy of 3 mev. and gamma radiation at an energy of 1.8 mev. This reaction has a cross section of 210 millibarns (mb.) for thermal neutrons and thus may be observed under borehole conditions.

If neutron generator 17 emits neutrons of energy greater than 2.1 mev., through either the D—T or D—D interactions, the reaction $Al^{27}(n,p)Mg^{27}$ may occur leading to 9.6 minute half-life $\beta^-$ radiation at 1.8 mev. and gamma radiation of 1 mev. Because this reaction has a cross section of 25 mb. and the activity has a longer half-life (9.6 minutes) as compared to the 2.3 minute half-life of the first-mentioned example, it does not occur as readily nor is it as easily detectable.

If the formations are irradiated with neutrons having an energy in excess of 2.39 mev., aluminum may undergo an $(n,\alpha)$ reaction leading to $Na^{24}$ having a 14.8 hour half-life, $\beta^-$ radiation of 1.4 mev. and gamma radiation at energy levels of 1.4 mev. and 2.8 mev. This long half-life means that it would require much longer activations to reach the same specific activity as in the other aluminum reactions and consequently is much less likely to be practicable for borehole operations.

B. Silicon

Turning now to an analysis of the element silicon, it will be noted that silicon is predominantly $Si^{28}$ (92.28%). Hence, reactions with this isotope are much more likely to occur than with the less abundant isotopes $Si^{29}$ and $Si^{30}$.

Neutrons in excess of 3.9 mev. may also excite $Al^{28}$ by the reaction $Si^{28}$ $(n,p)$ as well as some 6.7 minute $Al^{29}$ by the reaction $Si^{29}$ $(n,p)$. However, because of the lower abundance of isotope $Si^{29}$, the proportion of the activity leading to $Al^{29}$ would be substantially less than that leading to $Al^{28}$.

With reference to silicon of atomic weight 30, even though thermal neutrons can produce the reaction $$Si^{30}(n,\mu)Si^{31}$$

the half-life of $Si^{31}$ is 2.7 hours which is quite long for borehole operations. Moreover, $Si^{31}$ is known not to emit gamma rays. Thus, this reaction is not a favorable one.

Neutrons in excess of 15.7 mev. are required to produce the $Si^{28}(n,2n)$ reaction, forming $Si^{27}$ with a 4.5 second half-life which emits 3.6 mev. beta radiation due to positive emission $(\beta^+)$. As is well known, $B^+$ radiation is always accompanied by annihilation radiation (0.5 mev. gamma rays) which can be detected readily.

C. Oxygen

Radiative capture of neutrons in $O^{16}$, the predominant isotope of oxygen, leads to stable $O^{17}$ and hence there is no resultant radioactivity to be detected.

The isotope of oxygen of atomic weight 18, $O^{18}$, forms $O^{19}$ with a 29 second half-life which emits very energetic betas and gammas. However, even though the radiation and the half-life appear to be favorable for borehole operations, the abundance of $O^{18}$ is only 0.2%. Hence, this reaction may not be practicable for logging.

Additionally, $O^{16}$ undergoes the $(n,p)$ reaction, forming $N^{16}$, having a half-life of 7.5 seconds. However, neutrons in excess of 9.4 mev. are required. Nevertheless, with 14 mev. neutrons, this is the most likely reaction with oxygen and hence may be useful and the resulting 10 mev. $\beta^+$, or 6.2 mev. gammas may be readily detectable.

The $(n,2n)$ reaction in $O^{16}$ forming the 126 second half-life isotope $O^{15}$ requires neutrons in excess of 15.6 mev. While this may be attained in generator 17 by borbarding tritium with deuterons having an energy in excess of 1.5 to 2 mev., other reactions may be possible in a neutron generator to provide neutrons of sufficient energy to excite this and other high threshold reactions. It appears, however, that the most likely reaction in oxygen is the $(n,p)$ leading to 7.5 seconds $N^{16}$.

To summarize, when clay is bombarded by 14 mev. neutrons, predominantly the 9.6 minute $Mg.^{27}$, from both $Al^{27}$ $(n,p)$ and $Si^{30}$ $(n,\alpha)$ is derived. The aluminum reaction dominates because $Si^{30}$ is only present to the extent of 4.2%, whereas $Al^{27}$ is present to 100%. An almost equal amount of 2.3 minute $Al^{28}$ is also likely to be present from a fast reaction in $Si^{28}$ $(n,p)$ and to some extent from the lower energy neutrons forming $Al^{27}$ $(n,\gamma)$ $Al^{28}$. These radioactivities are readily distinguishable from the $O^{16}$ $(n,p)$ $N^{16}$ reaction, both because of the much shorter half-life of this reaction and because of the much greater energy of the radiations accompanying its decay.

II. SAND

Pure sand containing only $SiO_2$ may be readily identified in that fast neutrons produce predominantly 7.5 second $N^{16}$ from the $O^{16}$ $(n,p)$ reaction and $Al^{28}$ having a half-life of 2.3 minutes from the $Si^{28}$ $(n,p)$ reaction, and because there is essentially no activity with thermal neutrons by reason of the relatively long life, 2.7 hours, of $Si^{31}$ and the low abundance of its precursor $Si^{30}$ in the $(n,\gamma)$ reaction.

One problem encountered in searching for hydrocarbons is the analysis of sandy shales, i.e., the determination of the relative proportions of sand and clay in formations of interest. The apparatus of FIG. 1 may be employed in various ways for this purpose. For example, detector 25 may be arranged to respond to the delayed gamma radiation of the 2.3 minute activity resulting from the $Al^{27}$ $(n,\gamma)$ $Al^{28}$ reaction. Thus, aluminum content may be logged and, if desired, detector 24 may be responsive to thermal neutrons so that a porosity correction may be made in the log. Alternatively, the aluminum log may be used to correct false porosity indications which may be obtained due to the water of hydration normally present in clays that are found in various rock formations.

In order to detect silicon, detector 25 responds to the 2.3 minute activity just mentioned as a measurement of aluminum content and detector 24 is arranged to respond to gamma radiation due to the reactions $Al^{27}$ $(n,\gamma)$ $Al^{28}$ and $Si^{28}$ $(n,p)$ $Al^{28}$. By subtracting the measured outputs of the detectors from one another, silicon content may be logged.

Clay may also be identified by denoting the iron usually present. Thus, detector 24 may be arranged to respond to gamma radiation resulting from the 4.9 hour activity due to the reaction $Fe^{56}$ $(n,p)$ $Mn^{56}$ which has a threshold of 2.9 mev.

III. BAUXITE

Bauxite may be distinguished from sand and clay in that the reactions are limited to aluminum and oxygen and the characteristic reaction of silicon are completely absent.

IV. LIMESTONE

Two types of limestone formations may be prevalent, one being $CaCO_3$, predominantly calcite limestone, and the second being $CaCO_3 \cdot MgCO_3$, a dolomitic limestone.

A. Carbon

Very few of the reactions in carbon lead to radioactive isotopes of reasonable half-lives. The predominant isotope $C^{12}$ forms stable $C^{13}$ on radiative capture of neutrons and the 1.1% abundant $C^{13}$ forms radioactive $C^{14}$ on radiative capture of neutrons, but this has such a long half-life, 5800 years, and such weak radiation, 0.15 mev. $\beta^-$ and no gammas, that neither of these reactions may be of practical use.

Similarly, the $C^{12}$ $(n,\alpha)$, $Be^9$, $C^{13}$ $(n,\alpha)$ $Be^{10}$ and $C^{13}$ $(n,2n)$ $C^{12}$ reactions may be of no consequence because these lead to stable end products.

The $C^{13}$ $(n,p)$ reaction leading to $B^{13}$ is questionable inasmuch as the characteristics of this radioisotope are not available in published data.

Two reactions with carbon which are useful require very fast neutrons. One is the $C^{12}$ $(n,p)$ $B^{12}$ reaction, leading to 0.025 second half-life, 13 mev. $\beta^-$ and questionable gamma emission which requires neutrons in exvess of 13 mev. The other, the $C^{12}$ $(n,2n)$ reaction leads to 20.5 minute $C^{11}$ and requires neutrons in excess of 19 mev.

It may be possible that the D—T reaction in generator 17 (FIG. 1) activates sufficient $B^{12}$ by the $(n,p)$ reaction in $C^{12}$ to allow the 13 mev. $\beta^-$ to be detected by a scintillation wall detector of the type shown in FIG. 2. This detector is placed in close proximity to the generator 17 and the logging speed is made high in order to distinguish the 0.025 second activity.

Of course, the much longer lived 20.5 minute $C^{11}$ requires a different type of neutron generator in order to obtain neutrons of sufficient energy to excite this isotope.

Thus, a pure calcite limestone is characterized more by its oxygen content than by its carbon content. With fast neutrons the predominant induced activity is 7.5 second $N^{16}$ and no appreciable activity may be expected with thermal neutrons.

A dolomitic limestone may be distinguishable from a calcite limestone by the 9.6 minute $Mg^{27}$ formed when thermal neutrons are captured in the $Mg^{26}$. The 1.8 mev. $\beta^-$ may not be as readily detected as the 1 mev. gamma.

With fast neutrons, in addition to the foregoing activities excited in $CaCO_3$, some 60 second $Na^{25}$ resulting from the $Mg^{25}$ $(n,p)$ reaction, should be anticipated. However, the 2.7 mev. $\beta^-$ may be difficult to detect and the gamma rays are very soft, only 0.035 mev. in energy. Likewise, the 41 second $Ne^{23}$, formed by neutrons in excess of 4.5 mev., emits gamma rays of about 2.8 mev., but it may be indicated by detecting the 4.3 mev. $\beta^-$.

The detection of oxygen by the reaction $O^{16}$ $(n,p)$ $N^{16}$ resulting in 6.2 mev. gamma radiation may provide useful information relative to any formation. To this end, in place of detector 24, the scintillation detector of FIG. 2 is employed and amplitude selector 63 is adjusted so that indications of 6.2 mev. gamma radiation are obtained.

Since the oxygen content of the formations themselves may exhibit relatively small variations, oxygen content of the fluids contained by the formations may be observed. In other words, instead of $H_2O$, $C_xH_y$ may be present so that oxygen is effectively replaced by carbon. Thus, a type of hydrocarbon log may be derived by recording oxygen content versus depth. This type of log may, in addition to identifying hydrocarbon-containing strata, denote water-hydrocarbon interfaces with great accuracy.

V. OTHER CONSIDERATIONS

A. Chlorine

In a limestone containing brine, $Cl^{37}$ undergoes radiative capture with thermal neutrons producing 38 minute $Cl^{38}$ which may be readily detected by the high energy gamma rays emitted.

Another reaction which may take place is the $Cl^{35}$ $(n,\alpha)$ forming $P^{32}$. Even though this is an exoergic reaction, since the $P^{32}$ is of such long life, 14.3 days, and emits no gammas, it may be impractical to observe this radioactivity.

With fast neutrons two other reactions are possible. Phosphorus of atomic weight 34, $P^{34}$, may be formed which emits energetic betas, but the emission of gammas is uncertain. Through the $(n,2n)$ reaction $Cl^{34}$ of 33 minute half-life may be formed which emits a 2.4 mev. $\beta^+$, and annihilation radiation (0.5 mev. gamma radiation).

It is thus evident that it may be possible to identify chlorine by comparing the activities induced by slow neutrons and by fast neutrons.

B. Fluorine

In a formation containing the mineral apatite, the fluorine radiative-capture element is $F^{20}$ with 12 second half-life. It may be readily detected by means of resultant 2 mev. gamma radiation. The cross section for this reaction, however, is known to be quite small, only 9 mb.

With fast neutrons, $O^{19}$, having a 29 second half-life, may be produced from fluorine and is readily detectable through the 1.6 mev. gamma. In addition, $N^{16}$ may be formed with neutrons in excess of 1.5 mev. It has a 7.3 second half-life and emits 2.2 mev. gammas. The $F^{18}$ formed through an $(n,2n)$ reaction by neutrons in excess of 10.4 mev. has a rather long life, 1.9 hours, and consequently may not be in as high concentrations as the short-lived isotopes.

It is thus evident that fluorine is one of the easiest elements to detect; however, in looking for other elements it is fortunate that fluorine is not commonly found in high concentrations in subsurface formations. Otherwise this activity would tend to mask other activities of interest.

C. Phosphorus

The most interesting phosphorus reaction, where for example the mineral apatite is present, is the formation of $Al^{28}$ which as pointed out earlier may also be formed from silicon and aluminum. In the case of phosphorus this requires neutrons in excess of 4.3 mev. It is fortunate that phosphorus does not commonly occur, otherwise this reaction might be bothersome in identifying other elements of interest in logging a borehole in search of hydrocarbons.

Of course, other examples may suggest themselves; thus other minerals or combination of elements may be sought in the practice of the present invention.

In addition to logging in search of hydrocarbons, the methods and apparatus in accordance with the present invention may be employed in evaluating the uranium and vanadium content of formations.

Vanadium of atomic weight 51, $V^{51}$, which is present in 100% abundance undergoes a very convenient $(n,\gamma)$ reaction leading to $V^{52}$ with a 3.9 minute half-life which emits 2 mev. $\beta^-$ and 1.5 mev. gammas. This reaction may be readily detectable. The $(n,\gamma)$ reaction in $V^{51}$ leading to $Sc^{48}$ has a 44 hour half-life which may be unduly long for logging work, even though the 1.36 mev. gammas are readily detectable.

Uranium may be detected by the characteristic radio-activities of the numerous fission products formed and also by means of the delayed neutrons which are emitted in about 0.8% to 1% of the fissions that take place.

While particular embodiments of the present invention have been shown and described, it is apparent that changes and modifications may be made without departing from this invention in its broader aspects, and therefore, the aim in the appended claims is to cover all such changes and modifications as fall within the true spirit and scope of this invention.

We claim:

1. A method of logging earth formations which comprises the steps of: irradiating the earth formations with neutrons having energies included in a plurality of selected, discrete energy levels; and obtaining indications of a nuclear phenomenon resulting from neutron irradiation at each of said selected energy levels.

2. A method of logging earth formations traversed by a borehole which comprises the steps of: irradiating the earth formations via a sidewall zone of the borehole with neutrons having a relatively high energy level; simultaneously irradiating the earth formations with neutrons having a relatively low energy level; obtaining indications of a nuclear phenomenon resulting from neutron irradiation at said high energy level; and simultaneously obtaining indications of a nuclear phenomenon resulting from neutron irradiation at said low energy level.

3. A method of logging earth formations traversed by a borehole which comprises the steps of: irradiating the earth formations with neutrons having energies included in a plurality of selected, discrete energy levels; and obtaining indications of a nuclear phenomenon resulting from neutron irradiation at each of said energy levels as a function of depth in the borehole.

4. A method of logging earth formations which comprises the steps of: irradiating the earth formations with neutrons having energies included in a plurality of selected, discrete energy levels; and obtaining indications of gamma radiation resulting from neutron irradiation at each of said selected energy levels and having a given energy.

5. A method of logging earth formations which comprises the steps of: irradiating the earth formations with neutrons having energies included in a high energy range and in a low energy range; obtaining indications responsive to gamma radiation resulting from the capture of neutrons in said low energy range and indicative of aluminum content of the formations and responsive to the flux of neutrons in said high energy range slowed to low energies and representative of the hydrogen content of the earth formations.

6. A method of logging earth formations which comprises the steps of: irradiating the earth formations with neutrons having energies included in a high energy range and in a low energy range; obtaining indications responsive to neutrons in said high energy range slowed to relatively low energies by the earth formations and representative of the hydrogen content of the formations and responsive to gamma radiation resulting from capture of neutrons in said low energy range thereby to compensate for water of hydration normally present in certain aluminum containing materials of said formations.

7. A method of logging earth formations which comprises the steps of: irradiating the earth formations with neutrons having energies included in a plurality of selected, discrete energy levels; detecting the delayed gamma radiation resulting from interaction between neutrons at a lower of said energy levels and aluminum of atomic weight 27; detecting gamma radiation resulting from interactions between neutrons at a higher of said energy levels with aluminum of atomic weight 27 and silicon of atomic weight 28; and obtaining indications of a predetermined relationship between the detected gamma radiations.

8. Apparatus for logging earth formations comprising: a source of high-energy monoenergetic neutrons; a neutron moderator partially enclosing said source so that the earth formations are irradiated with neutrons of relatively high energy and with neutrons of relatively low energy; and a detection system including means responsive to a nuclear phenomenon resulting from bombardment of earth formations by neutrons of said high energy, and means responsive to a nuclear phenomenon resulting from irradiation of earth formations by neutrons of said low energy.

9. Apparatus for logging earth formations comprising: a source of high-energy monoenergetic neutrons; a neutron moderator partially enclosing said source so that the earth formations are irradiated with neutrons of relatively high energy and with neutrons of relatively low energy; a first detector responsive to a nuclear phenomenon resulting from bombardment of earth formations by neutrons of said high energy; and a second detector responsive to a nuclear phenomenon resulting from irradiation of earth formations by neutrons of said low energy.

10. Apparatus for logging earth formations traversed by a borehole comprising; a housing adapted to be passed through the borehole; means for pressing at least a portion of said housing against a sidewall zone of the borehole; a source of high-energy monoenergetic neutrons supported within said housing; a neutron moderator partially enclosing said source to define an opening facing said sidewall zone through which neutrons of relatively high energy may pass and irradiate the earth formations, said moderator being adapted to slow said neutrons from said source to a relatively low energy for irradiating the formations; and a detection system including means responsive to a nuclear phenomenon resulting from bombardment of earth formations by neutrons of said high energy, and means responsive to a nuclear phenomenon resulting from irradiation of earth formations by neutrons of said low energy.

11. Apparatus for logging earth formations traversed by a borehole comprising: a housing adapted to be passed through the borehole; means for pressing at least a portion of said housing against a sidewall zone of the borehole; a source of high-energy monoenergetic neutrons supported within said housing adjacent said portion thereof; a neutron moderator partially enclosing said source to define an opening facing said sidewall zone through which neutrons of relatively high energy may pass and irradiate the earth formations, said moderator being adapted to slow said neutrons from said source to a relatively low energy; a first detector supported within said housing adjacent said portion thereof and responsive to a nuclear phenomenon resulting from bombardment of earth formations by neutrons of said high energy; a second detector supported within said housing and responsive to a nuclear phenomenon resulting from irradiation of earth formations by neutrons of said low energy; and a shield interposed between said first and said second detectors.

12. Apparatus for logging earth formations comprising: a source of high-energy monoenergetic neutrons; a neutron moderator partially enclosing said source so that the earth formations are irradiated with neutrons of relatively high energy and with neutrons of relatively low energy; a first detector responsive to gamma radiation of a predetermined energy resulting from bombardment of earth formations by neutrons of said high energy; and a second detector responsive to gamma radiation of a predetermined energy resulting from irradiation of earth formations by neutrons of said low energy.

13. Apparatus for logging earth formations traversed by a borehole comprising: a source of neutrons supported for movement through the borehole and including a first target adapted to react with deuterium ions to produce neutrons of a first high energy and a second target adapted to react with deuterium ions to produce neutrons of a second energy higher than said first energy, and means for selectively bombarding said targets with deuterium ions; a neutron moderator supported to intercept and slow neutrons from said first target to a relatively low energy; and a detection system including means responsive to a nuclear phenomenon resulting from bombardment of earth formations by neutrons of said second energy, and means responsive to a nuclear phenomenon resulting from irradiation of earth formations by neutrons of said low energy.

14. Apparatus for logging earth formations traversed by a borehole comprising: a housing adapted to be passed through the borehole; means for pressing at least a portion of said housing against a sidewall zone of the borehole; a source of high-energy monoenergetic neutrons supported within said housing; a neutron moderator partially enclosing said source so that the earth formations are irradiated with neutrons of relatively high energy and with neutrons of relatively low energy; a first detector supported within said housing and responsive to a nuclear phenomenon resulting from bombardment of earth formations by neutrons of one of said high and said low energies; an auxiliary housing pressed against another sidewall zone of the borehole; and a second detector supported within said auxiliary housing and responsive to nuclear phenomenon resulting from irradiation of earth formations by neutrons of one of said high and said low energies.

15. Apparatus for logging earth formations traversed by a borehole comprising: a source of high energy monoenergetic neutrons adapted to be passed through the borehole; a neutron moderator partially enclosing said source so that the earth formations are irradiated with neutrons of relatively high energy and with neutrons of relatively low energy; a detection system including a first pair of detectors longitudinally spaced from one another relative to the axis of the borehole and responsive to a nuclear phenomenon resulting from bombardment of earth formations by neutrons of said high energy, and a second pair of detectors longitudinally spaced from one another relative to the axis of the borehole and responsive to a nuclear phenomenon resulting from irradiation of earth formations by neutrons of said low energy; and means for indicating a selected relationship between the outputs of each of said first and said second pairs of detectors.

16. A method of logging earth formations which comprises the steps of: irradiating the earth formations with neutrons substantially all of which have energies up to, but no greater than 2.1 million electron volts; and obtaining indications of gamma radiation resulting from interactions between such neutrons and at least one constituent of the earth formations.

References Cited in the file of this patent

UNITED STATES PATENTS

| | | |
|---|---|---|
| 2,296,176 | Neufeld | Sept. 15, 1942 |
| 2,469,461 | Russell | May 10, 1949 |
| 2,469,462 | Russell | May 10, 1949 |
| 2,489,436 | Salisbury | Nov. 29, 1949 |
| 2,648,780 | Herzog | Aug. 11, 1953 |
| 2,689,918 | Youmans | Sept. 21, 1954 |
| 2,712,081 | Fearon et al. | June 28, 1955 |
| 2,752,504 | McKay | June 26, 1956 |
| 2,763,788 | Herzog | Sept. 18, 1956 |

UNITED STATES PATENT OFFICE
CERTIFICATE OF CORRECTION

Patent No. 2,996,618                      August 15, 1961

Clark Goodman et al.

It is hereby certified that error appears in the above numbered patent requiring correction and that the said Letters Patent should read as corrected below.

Column 6, line 30, for "414,976, now Patent No. 2,827,946" read -- 441,976, now Patent No. 2,991,364 --; column 8, line 18, the formula should appear as shown below instead of as in the patent:

$$Si^{30}(n,\gamma)Si^{31}$$

same column 8, line 49, for "borbarding" read -- bombarding --; column 9, lines 59 and 60, for "exvess" read -- excess --.

Signed and sealed this 30th day of January 1962.

(SEAL)
Attest:

ERNEST W. SWIDER
Attesting Officer

DAVID L. LADD
Commissioner of Patents